No. 749,825. PATENTED JAN. 19, 1904.
A. PRIESTMAN.
APPARATUS FOR AUTOMATICALLY CONTROLLING THE FLOW OF LIQUIDS.
APPLICATION FILED AUG. 10, 1903.
NO MODEL. 3 SHEETS—SHEET 2.
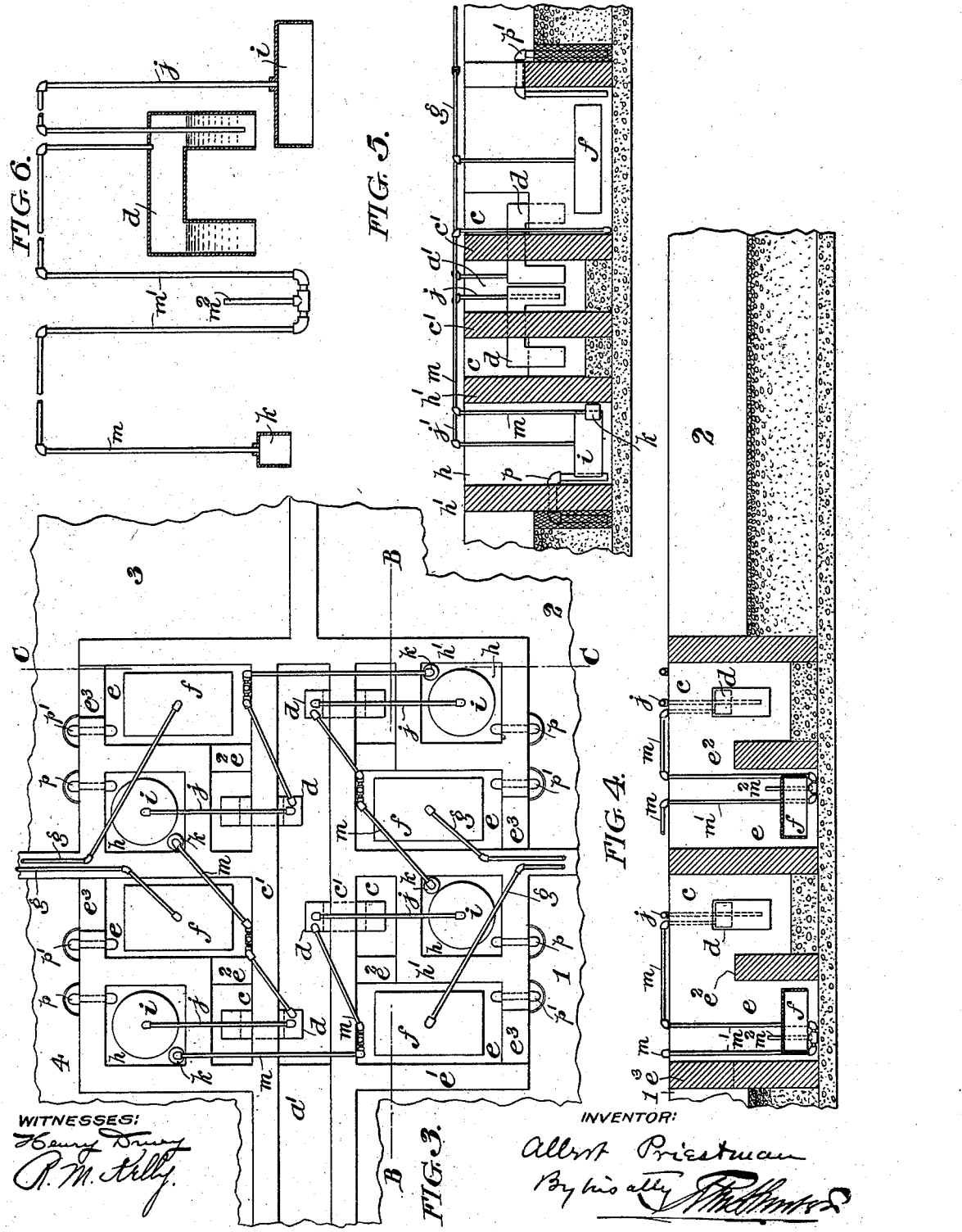

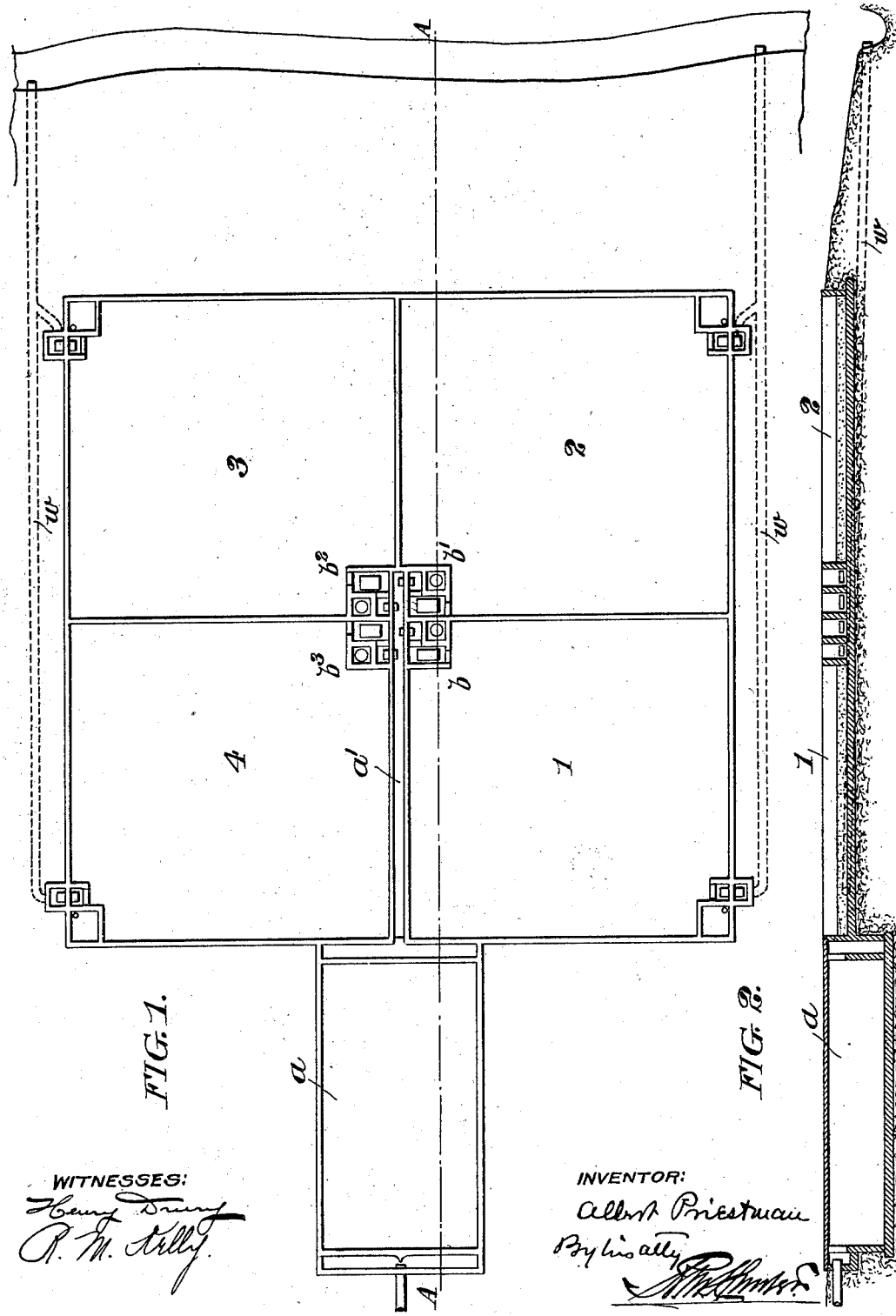

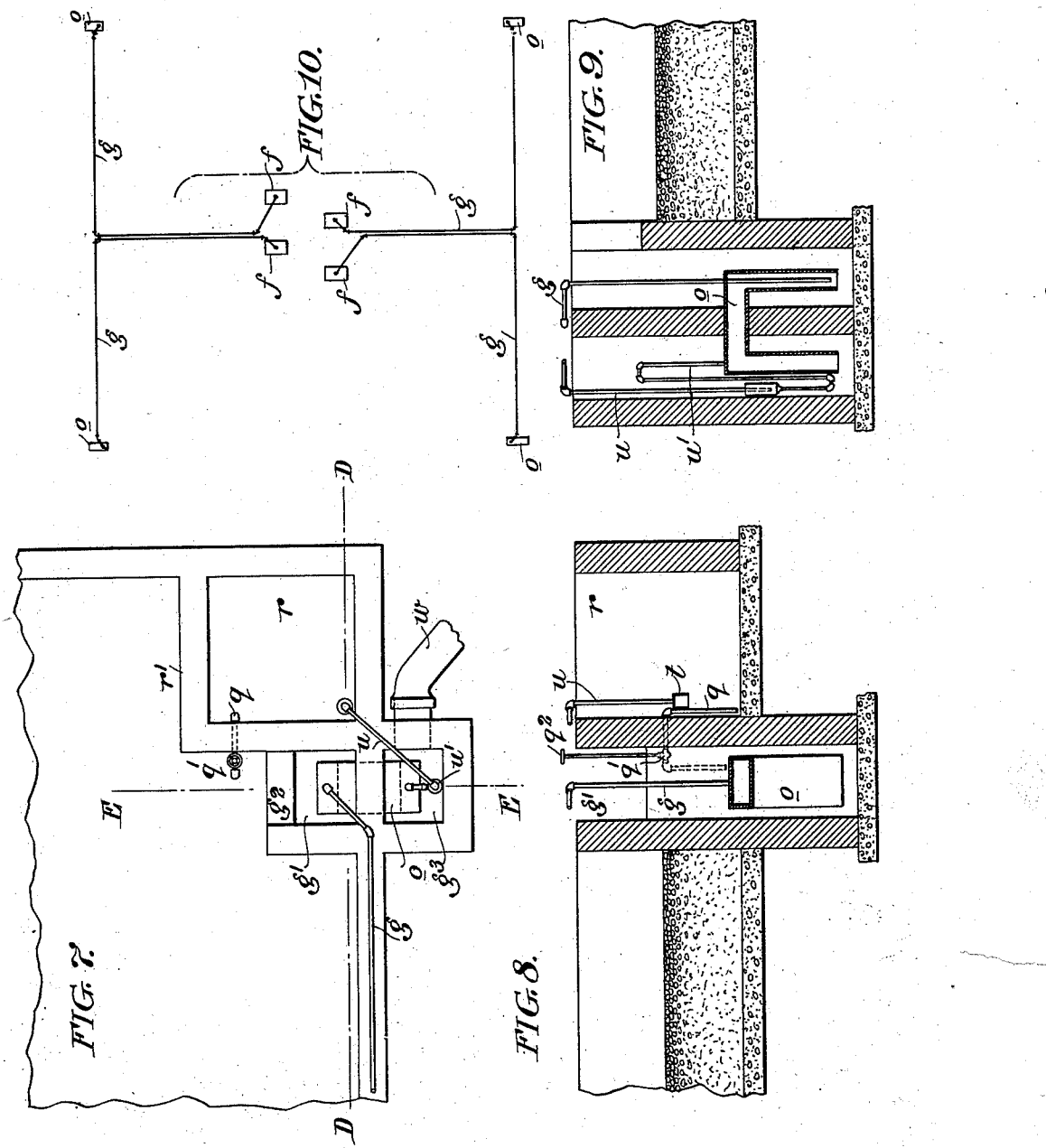

No. 749,825. Patented January 19, 1904.

UNITED STATES PATENT OFFICE.

ALBERT PRIESTMAN, OF PHILADELPHIA, PENNSYLVANIA.

APPARATUS FOR AUTOMATICALLY CONTROLLING THE FLOW OF LIQUIDS.

SPECIFICATION forming part of Letters Patent No. 749,825, dated January 19, 1904.

Application filed August 10, 1903. Serial No. 168,919. (No model.)

*To all whom it may concern:*

Be it known that I, ALBERT PRIESTMAN, of the city and county of Philadelphia, State of Pennsylvania, have invented an Improvement in Apparatus for Automatically Controlling the Flow of Liquids, of which the following is a specification.

It is the object of this invention to enable the flow of liquids into a tank or reservoir and their discharge therefrom to be automatically controlled by air and water sealing and relieving devices, whereby the use of valves and moving parts may be dispensed with.

It is also an object of my invention to enable the liquid to remain standing in the tank for any desired period of time and at the expiration of such period to be automatically discharged.

The invention is especially adapted for use in connection with systems of sewage purification in which the sewage is supplied to a filtering-bed and after detention therein for more or less time is discharged and the filtering-bed is exposed to the atmosphere. In such applications of the invention it is especially adapted to be used in connection with a series of filtering-beds to which the sewage is supplied in succession.

The automatic controlling devices are so arranged and operated that as soon as the inlet to one tank or reservoir is opened and the liquid commences to flow in the outlet of that tank is automatically closed. As soon as the liquid in one tank has reached the desired level the inlet to that tank is closed and the inlet to the next tank in the series is opened, whereupon the outlet to that tank is closed. The outlet to each tank remains closed for a given period of time, which is independent of the flow into the tank and is not affected by its variations and which may be regulated to suit the requirements. After the outlet is opened and the liquid has passed out the tank will remain empty with its filtering-bed exposed to the atmosphere until in the cycle of operations the inlet to that tank is again opened by the operation of the liquid in the tank next preceding in the series. All of these operations are effected by air-pressure produced by the rising of the liquid in the tank or operating-chambers. The closing of each inlet or outlet is effected by air binding the inlet or outlet pipe, and the opening of those pipes is effected by relieving the air seal. The air seal thus formed produces a perfect closure of the passages and there is no leakage. The circulation of the liquid is effected wholly by gravity, and no suction devices are required.

Large volumes of liquid may be controlled without sacrificing more than a few inches of fall, which is in many localities a distinct advantage over the use of siphonic action.

Another advantage of the use of air locking devices for the outlets is that they are left open during resting hours and the drippings will not collect and stagnate at the bottom of the filter and a better aeration of the filtering-bed is obtained than would be possible if the tanks were discharged by siphonic action. The positive locking of the outlet when the sewage is flowing into the tank causes the sewage to sink by gravity through the filtering material and more effectively expels the carbonic-acid gas.

In the drawings, Figure 1 is a plan view illustrating the application of the invention of a system of sewage purification employing four filtering-tanks. Fig. 2 is a longitudinal sectional view of the same on the line A A of Fig. 1. Fig. 3 is an enlarged plan view of the controlling devices adjacent to the inlet. Fig. 4 is a longitudinal section on the line B B of Fig. 3. Fig. 5 is a transverse section on the line C C of Fig. 3. Fig. 6 is a diagram showing the devices for sealing and unsealing the inlet-pipe. Fig. 7 is a plan view, enlarged, of the outlet devices. Fig. 8 is a longitudinal section on the line D D of Fig. 7. Fig. 9 is a transverse section on the line E E of Fig. 7, and Fig. 10 is a diagram illustrating the arrangement of the outlet-sealing devices.

As shown, the system is arranged with four filtering-tanks adapted to be filled and discharged in succession. The invention is not, however, limited to this particular arrangement and may be used with any number of tanks.

*a* is the septic tank, from which the sewage flows through a suitable conduit $a'$ to the feed devices $b\ b'\ b^2\ b^3$ for the filtering-tanks 1 2 3 4. There is a feed device for each tank, and as they are identical a description of one will be sufficient. These feed devices are shown more particularly in Figs. 3, 4, 5, and 6. Adjacent to each tank is a supply-chamber $c$, separated from the supply-conduit $a'$ by a wall $c'$. Forming a communication between the conduit $a'$ and the chamber $c$ is an inverted-U-shaped inlet-pipe $d$, having one open leg in the conduit and the other in the chamber and the connecting portion extending through the wall. The sewage from the conduit $a'$ flows through this pipe $d$ into the chamber $c$.

$e$ is a second chamber inclosed by a wall $e'$ and having a passage-way $e^2$ from the chamber $c$ and a passage-way $e^3$ into the filtering-tank 1. Within the chamber $e$ is an inverted bell $f$, from which an air-pipe $g$ leads to the outlet-controlling devices of the tank. These outlet-controlling devices are particularly shown in Figs. 7, 8, and 9, and their connection with bells $f$ by the air-pipes $g$ is illustrated in Fig. 10. As these outlet-controlling devices are identical, the description of one will suffice for all.

$g'$ is a chamber in the tank 1, with which it communicates through an opening $g^2$.

$o$ is an inverted-U-shaped outlet-pipe, having one open leg in the chamber $g'$ and the other in a chamber $g^3$, communicating with the discharge-main $w$. The horizontal portion of the pipe $o$ extends through the partition-wall between the chambers $g'$ and $g^3$. When the liquid in the tank reaches a proper height, it will pass through the opening $g^2$ into the chamber $g'$, and if its passage is not otherwise prevented it will flow through the pipe $o$ into the chamber $g^3$ and thence to the main $w$. The air-pipe $g$ extends down into the inlet-leg of the pipe $o$ to a point near the end, as shown in Fig. 9, and consequently when air is forced from the bell $f$ through the pipe $g$ it will ascend into the upper portion of the pipe $o$ and form an air seal, so that the outflow of the sewage will be prevented until this air seal is broken. It results, therefore, that immediately after the inlet $d$ to any tank is opened and the sewage commences to flow into the tank the outlet is closed and will remain closed until the proper time is reached for discharging the contents of the tank.

The next step in the cycle of operation is the closing of the inlet $d$ when the tank it supplied is filled to the proper level. For this purpose there is a chamber $h$, divided by walls $h'$ from the chambers $c$ and $e$ and tank 1 and having communication with the tank through a siphon $p$, extending through the wall $h$. In the chamber $h$ is an inverted bell $i$, having a pipe $j$ leading to the outlet-leg of the supply-pipe $d$, into which it extends to a point near the bottom, as shown in Fig. 6. When the sewage reaches the proper level in the tank 1, it will flow through the siphon $p$ into the chamber $h$ and rising therein will compress the air in the bell $i$ and force air through the pipe $j$ into the supply-pipe $d$ and air-bind it, thus closing the supply. When the supply to tank No. 1 is thus automatically closed, the supply to tank No. 2 is opened. For this purpose there is a second and smaller bell $k$ in the chamber $h$, which communicates through a pipe $m$ with the inlet-leg of the supply-pipe $d$ to tank No. 2. This pipe $m$ has a U-bend $m'$, located for convenience in the chamber $e$ of the controlling devices of tank No. 2, and this bend is provided with an open upright pipe $m^2$. (See Fig. 6.) Supposing the inlet-pipe $d$ to tank No. 2 to have been closed by the formation of the air seal through bell $i$ and pipe $j$ when tank No. 2 was previously charged in the manner above described with reference to tank No. 1, it results that when the sewage rises in chamber $h$ of tank No. 1 to seal the inlet $d$ to that tank it will also compress the air in the small bell $k$. This will force air through the pipe $m$ into the bend $m'$, which will force a column of liquid out of the open upright pipe $m^2$, thus producing a flow through the pipe $m$ from the inlet-pipe $d$ and breaking the seal therein. The supply to tank No. 2 is then opened, and the same operations take place in connection therewith that have been described in connection with tank No. 1.

After the sewage has been allowed to stand for a sufficient period of time in tank No. 1 the outlet-pipe $o$ is unsealed. For this purpose there is a chamber $r$, divided by walls $r'$ from the tank and outlet-chamber $g'$, which communicates with the tank through a siphon $q$, provided with a valve $q'$. In the chamber $r$ is a small inverted bell $t$, from which leads a pipe $u$, which projects into an enlargement upon the open end of a siphon $u'$, leading from the outlet-leg of the outlet-pipe $o$. When the liquid flowing through the siphon $q$ into the chamber $r$ reaches the proper level, the air is compressed in the bell $t$ and air is forced through pipe $u$ into the siphon $u'$. This air will force out a quantity of liquid from the open enlarged end of the siphon, producing a flow of air from the pipe $o$ and opening the outlet to allow the sewage to pass out freely from tank No. 1. When the liquid flows out of the tank, the contents of the chambers $e$, $r$, and $h$ are siphoned out through the pipes $p'$, $q$, and $p$.

By regulating the thoroughfare through the pipe $q$, which may be effected by the adjustment of the valve $q'$, the time that will elapse after the tank 1 is full before the outlet $o$ will be unsealed may be regulated to suit the requirements, and the sewage may be allowed to stand for considerable time in each tank before it is released.

As the opening of the outlet $o$ is controlled by the rise of the liquid in the chamber $r$, which is controlled by the pipe $q$, it will not be subject to variations in the flow of the liquid into the tank or reservoir.

Supposing the supply-pipe $d$ to the feed devices to tank No. 1 to have been opened in the manner described, the sewage from the conduit $a'$ will flow through that pipe first into the chamber $c$ and thence through the passage-way $e^2$ into the chamber $e$, and as it rises in the chamber $e$ and before it flows into the tank 1 it will compress the air in the bell $f$ and force air through the pipe $g$ into the outlet-pipe $o$, which air ascending into the upper portion of the pipe $o$ will air-bind it and lock the outlet. The sewage continues to flow into the tank 1 through the supply-pipe $d$ until the tank becomes filled. When a proper level is reached in the tank 1 the sewage begins to flow through the siphon $p$ into the chamber $h$, and rising therein compresses the air in the bell $i$ and forces air through the pipe $j$ into supply-pipe $d$ and similarly air-binds it and locks the inlet. At the same time the rising sewage in the chamber $h$ compresses the air in the small bell $k$ and forces air through the pipe $m$, which passing through the bend $m'$ forces a column of liquid out through the upright pipe $m^2$, thereby producing a flow from the inlet-pipe $d$ to tank No. 2 through the pipe $m$ and breaking the air seal in that pipe, which had previously been formed therein in the manner described in connection with tank No. 1. The sewage will then begin to flow into tank No. 2, and exactly the same cycle of operations will take place in connection therewith that have been described as taking place in connection with tank No. 1—that is to say, the outlet will be closed—and when the tank has become filled its supply-pipe will be sealed and the supply-pipe to tank No. 3 will be opened. Meanwhile the sewage in tank No. 1 is flowing through the siphon $q$ into the chamber $r$, the amount of flow being regulated by the valve $q'$, and when it has reached the proper level therein it will compress the air in the small bell $t$ and force air through the pipe $u$ into the open end of the siphon $u'$ and break the air seal in the outlet $o$.

One special advantage of the form of air-locking devices described, in which the pipes $d$ and $o$ are of inverted-U shape, is that the air seal is not weakened by any surplus of air that may be forced from the bells $i$ and $f$ through the pipes 7 and 9. In air-locking devices, in which the pipe is of serpentine form with three legs, the air which is forced into the central leg displaces liquid from the outer leg, and if there is a surplus of air forced in so much liquid will be displaced that the air seal will be weakened, and if the pressure on the inlet side is increased the seal will be forced. This is not possible in the construction shown, since the surplus air will simply be forced out of the pipe and will escape through the water in the tank without affecting the air seal formed in the pipe.

What I claim as new, and desire to secure by Letters Patent, is as follows:

1. In apparatus for automatically controlling the flow of liquids, the combination with a tank to receive the liquid, a liquid-inlet pipe, means controlled by the rise of liquid to air-bind said inlet-pipe, means also controlled by the rise of the liquid to unseal said inlet-pipe, an outlet-pipe for the discharge of the liquid from the tank, and means controlled by the rising liquid at the point of entering said tank to air-bind the outlet-pipe when the liquid commences to enter through the inlet-pipe.

2. In apparatus for automatically controlling the flow of liquids, the combination with a tank to receive the liquid, a liquid-inlet pipe, means controlled by the rise of liquid to air-bind said inlet-pipe, means also controlled by the rise of the liquid to unseal said inlet-pipe, an outlet-pipe for the discharge of the liquid from the tank, means controlled by the rising liquid at the point of entering said tank to air-bind the outlet-pipe when the liquid commences to enter through the inlet-pipe, and means controlled by the rise of the liquid to unseal said outlet-pipe.

3. In apparatus for automatically controlling the flow of liquids, the combination with a tank to receive the liquid, a liquid-inlet pipe, means controlled by the rise of liquid to air-bind said inlet-pipe, means also controlled by the rise of the liquid to unseal said inlet-pipe, an outlet-pipe for the discharge of the liquid from the tank, means controlled by the rising liquid at the point of entering said tank to air-bind the outlet-pipe when the liquid commences to enter through the inlet-pipe, means controlled by the rise of the liquid to unseal said outlet-pipe, and means to control the flow of liquid to said means for unsealing the outlet-pipe, whereby the liquid may be retained for a greater or less period of time in said tank before it is discharged.

4. In apparatus for automatically controlling the flow of liquids, the combination of a series of tanks adapted to be filled and emptied in succession, a liquid-inlet pipe to each of said tanks, means controlled by the rise of the liquid in each tank to air-bind the inlet-pipe to that tank, an outlet-pipe from each tank, means also controlled by the rise of liquid in each tank to air-bind the outlet-pipe to that tank, means controlled by the rise of liquid in each tank to break the air seal in the inlet-pipe of the next tank in the series, and means controlled by the rise of liquid in each tank to break the air seal in the outlet from that tank.

5. In apparatus for automatically controlling the flow of liquids, the combination of a tank, an inlet-pipe for conducting the liquid into said tank, means for controlling said inlet-pipe, an outlet-pipe from said tank, and means controlled by the rise of liquid in said tank to air-bind said outlet when the liquid begins to enter said tank.

6. In apparatus for automatically controlling the flow of liquids, the combination of a tank, an inlet-pipe for conducting the liquid into said tank, means for controlling said inlet-pipe, an outlet-pipe from said tank, means controlled by the rise of liquid in said tank to air-bind said outlet when the liquid begins to enter said tank, and means also controlled by the rise of liquid to break said air seal in the outlet-pipe.

7. In apparatus for automatically controlling the flow of liquids, the combination of a tank, an inlet-pipe for conducting the liquid into said tank, means for controlling said inlet-pipe, an outlet-pipe from said tank, an air-bell arranged in the inlet passage-way between said inlet-pipe and tank, and an air-pipe leading from said bell and dipping into said outlet-pipe.

8. In apparatus for automatically controlling the flow of liquids, the combination of a tank, an inlet-pipe for conducting the liquid into said tank, an outlet-pipe from said tank, an air-bell arranged in the inlet passage-way between said inlet-pipe and tank, an air-pipe leading from said bell and dipping into said outlet-pipe, a chamber communicating with the tank, an air-bell in said chamber and an air-pipe leading from said outlet-pipe to break the air seal therein when air is compressed in said bell.

9. In apparatus for automatically controlling the flow of liquids, the combination of a tank, an inlet-pipe for conducting the liquid into said tank, an outlet-pipe from said tank, an air-bell arranged in the inlet passage-way between said inlet-pipe and tank, an air-pipe leading from said bell and dipping into said outlet-pipe, a chamber communicating with the tank, a siphon-pipe leading from said outlet-pipe, an air-bell in said chamber, and an air-pipe leading from the bell in said chamber to the siphon-pipe from the outlet-pipe.

10. In apparatus for automatically controlling the flow of liquids, the combination of a tank, an inlet-chamber, a second chamber between said inlet-chamber and the tank having communication with said inlet-chamber and with the tank, an inlet-pipe forming a communication between the inlet-chamber and the supply, an outlet-chamber adjacent to the outlet of the tank and having communication with said tank, an outlet-pipe forming a communication between said outlet-chamber and discharge, an air-bell in the chamber between the inlet-chamber and the tank, an air-pipe leading from said bell to the outlet-pipe, and means to control the supply-pipe.

11. In apparatus for automatically controlling the flow of liquids, the combination of a tank, an inlet-chamber, a second chamber between said inlet-chamber and the tank having communication with said inlet-chamber and with the tank, an inlet-pipe forming a communication between the inlet-chamber and the supply, an outlet-chamber adjacent to the outlet of the tank and having communication with said tank, an outlet-pipe forming a communication between said outlet-chamber and discharge, an air-bell in the chamber between the inlet-chamber and the tank, an air-pipe leading from said bell to the outlet-pipe, means to control the supply-pipe, a second chamber adjacent to the outlet-chamber, a siphon between said second chamber and the tank, an air-bell in said second chamber, and an air-pipe leading from said bell and communicating with the outlet-pipe.

12. In apparatus for automatically controlling the flow of liquids, the combination of a tank, an inlet-chamber, a second chamber between said inlet-chamber and the tank having communication with said inlet-chamber and with the tank, an inlet-pipe forming a communication between the inlet-chamber and the supply, an outlet-chamber adjacent to the outlet of the tank and having communication with said tank, an outlet-pipe forming a communication between said outlet-chamber and discharge, an air-bell in the chamber between the inlet-chamber and the tank, an air-pipe leading from said bell to the outlet-pipe, a third chamber adjacent to the inlet-chamber, a siphon between said third chamber and the tank, an air-bell in said third chamber, and an air-pipe leading from said air-bell to the inlet-pipe.

13. In apparatus for automatically controlling the flow of liquids, the combination of a tank, an inlet-chamber, a second chamber between said inlet-chamber and the tank having communication with said inlet-chamber and with the tank, an inlet-pipe forming a communication between the inlet-chamber and the supply, an outlet-chamber adjacent to the outlet of the tank and having communication with said tank, an outlet-pipe forming a communication between said outlet-chamber and discharge, an air-bell in the chamber between the inlet-chamber and the tank, an air-pipe leading from said bell to the outlet-pipe, a third chamber adjacent to the inlet-chamber, a siphon between said third chamber and the tank, an air-bell in said third chamber, an air-pipe leading from said air-bell to the inlet-pipe, a second bell in said third chamber, and a relief-pipe leading from said second bell to the supply-pipe to another tank.

14. In apparatus for automatically controlling the flow of liquids, the combination of two tanks adapted to be filled and emptied in succession, a supply-pipe to each tank, a chamber adjacent to one supply-pipe, having communication with the tank, an air-bell in said chamber, an air-pipe from said bell to the supply-pipe of that tank, a second bell in said chamber, and a relief-pipe leading from said second bell to the supply-pipe of the next tank having a U-bend $m'$ provided with an upright discharge-pipe $m^2$.

In testimony of which invention I hereunto set my hand.

ALBERT PRIESTMAN.

Witnesses:
  ERNEST HOWARD HUNTER,
  R. M. KELLY.